US012749750B2

(12) United States Patent
Cho et al.

(10) Patent No.: US 12,749,750 B2
(45) Date of Patent: Sep. 29, 2026

(54) BATTERY PACK

(71) Applicant: Samsung SDI Co., Ltd., Yongin-si (KR)

(72) Inventors: Mansik Cho, Yongin-si (KR); Jaemin Kim, Yongin-si (KR); Soomin Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 912 days.

(21) Appl. No.: 17/817,831

(22) Filed: Aug. 5, 2022

(65) Prior Publication Data

US 2023/0038489 A1 Feb. 9, 2023

(30) Foreign Application Priority Data

Aug. 5, 2021 (KR) ........................ 10-2021-0103441

(51) Int. Cl.
*H01M 50/209* (2021.01)

(52) U.S. Cl.
CPC ................................. *H01M 50/209* (2021.01)

(58) Field of Classification Search
CPC .. H01M 50/20; H01M 50/204; H01M 50/207; H01M 50/209; H01M 50/233; H01M 50/242; H01M 50/244; H01M 50/289; H01M 50/291
See application file for complete search history.

(56) References Cited

U.S. PATENT DOCUMENTS 11,114,718 B2 9/2021 Nishikawa et al.
2014/0170474 A1 6/2014 Roh
2017/0306518 A1 10/2017 Hashimoto et al.
2020/0127344 A1 4/2020 Lim et al.
2020/0176740 A1 6/2020 Cassard et al.
2021/0119287 A1 4/2021 Shi et al.
2021/0194085 A1 6/2021 Miyoshi et al.
2021/0351456 A1* 11/2021 Yamamoto .......... H01M 50/251
2021/0351470 A1 11/2021 Uemura
(Continued)

FOREIGN PATENT DOCUMENTS

CN 103872269 A 6/2014
CN 107304480 A 10/2017
(Continued)

OTHER PUBLICATIONS

EPO Extended European Search Report dated Dec. 16, 2022, issued in corresponding European Patent Application No. 22189106.2 (7 pages).
(Continued)

*Primary Examiner* — Allison Bourke
*Assistant Examiner* — Travis L. Martin
(74) *Attorney, Agent, or Firm* — Womble Bond Dickinson (US) LLP

(57) ABSTRACT

A battery pack includes: a plurality of battery cells; and a housing providing an accommodation space configured to accommodate the plurality of battery cells and comprising a side wall and a bottom wall which are in contact with each other at a corner position that faces a corner position of each of the battery cells, the housing having a spacing portion which is concavely recessed at the bottom wall to space the corner position of the battery cell apart from the corner position of the housing.

19 Claims, 5 Drawing Sheets

(56) References Cited

U.S. PATENT DOCUMENTS

| | | | | |
|---|---|---|---|---|
| 2021/0384579 | A1* | 12/2021 | Holubarsch | H01M 50/242 |
| 2022/0013827 | A1 | 1/2022 | Egashira et al. | |
| 2023/0038489 | A1 | 2/2023 | Cho et al. | |

FOREIGN PATENT DOCUMENTS

| | | | |
|---|---|---|---|
| CN | 209401664 | U | 9/2019 |
| CN | 112514145 | A | 3/2021 |
| CN | 218602598 | U | 3/2023 |
| JP | 6679260 | B2 | 4/2020 |
| JP | 2021-99952 | A | 7/2021 |
| KR | 10-2020-0033778 | A | 3/2020 |
| KR | 10-2111507 | B1 | 5/2020 |
| KR | 10-2020-0067100 | A | 6/2020 |
| WO | 2017/056742 | A1 | 4/2017 |
| WO | 2020/026963 | A1 | 2/2020 |
| WO | 2020/166182 | A1 | 8/2020 |

OTHER PUBLICATIONS

European Office Action dated Dec. 11, 2024, issued in European Patent Application No. 22189106.2, 5 pages.
Chinese Office Action corresponding to CN Application No. 202210943923.5, dated Sep. 22, 2025 (8 pages).
Korean Office Action corresponding to KR Application No. 10-2021-0103441, dated Nov. 5, 2025 (7 pages).

* cited by examiner

BATTERY PACK

CROSS-REFERENCE TO RELATED APPLICATION

The present application claims priority to and the benefit of Korean Patent Application No. 10-2021-0103441, filed on Aug. 5, 2021, in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries are batteries that can be repeatedly charged and discharged, unlike primary batteries that generally cannot be recharged after being discharged. Secondary batteries may be used, for example, as energy sources for mobile devices, electric vehicles, hybrid vehicles, electric bicycles, uninterruptible power supplies, etc. Also, the secondary batteries may be used in the form of a single battery depending on the types of external devices to be employed or may be used in the form of a pack in which a plurality of batteries are connected and bound as a unit.

Small mobile devices, such as cell phones, can be operated for a certain period of time by the output and capacity of a single battery, but large size mobile devices, such as laptops or electric vehicles and hybrid vehicles that consume a lot of power, require long-term operation and high-power operation. In the latter case, the pack type including a plurality of batteries is preferred due to limitations of output and capacity, and the output voltage or output current can be increased according to the number of built-in batteries.

The above information disclosed in this Background section is only for enhancement of understanding of the background and therefore the information discussed in this Background section does not necessarily constitute prior art.

SUMMARY

One or more embodiments include a battery pack capable of preventing or reducing electrical and physical interference between a battery cell and a housing accommodating a battery cell at a corner position relatively vulnerable to external impact, thereby securing insulation between the battery cell and the housing and protecting the battery cell.

Additional aspects will be set forth in part in the description which follows and, in part, will be apparent from the description, or may be learned by practice of the presented embodiments of the disclosure.

According to one or more embodiments of the present disclosure, a battery pack includes: a plurality of battery cells; and a housing providing an accommodation space configured to accommodate the plurality of battery cells and including a side wall and a bottom wall which are in contact with each other at a corner position that faces a corner position of each of the battery cells, the housing having a spacing portion which is concavely recessed formed on the bottom wall to space the corner position of the battery cell apart from the corner position of the housing.

According to some embodiments, the spacing portion may be formed on an inner surface of the housing that faces the battery cell.

According to some embodiments, the spacing portion may extend from the bottom wall of the housing to the side wall of the housing.

According to some embodiments, the spacing portion may include: a first portion formed on the bottom wall of the housing; and a second portion formed on the side wall of the housing.

According to some embodiments, the first portion of the spacing portion may be formed such that an inner surface of the bottom wall of the housing is concavely recessed toward an outer surface of the bottom wall of the housing.

According to some embodiments, the bottom wall of the housing may include: the first portion of the spacing portion formed concavely recessed; and a support formed at a position out of the first portion of the spacing portion and having a flat shape to support a bottom surface of the battery cell.

According to some embodiments, the support may include an inner surface and an outer surface of the housing extending parallel to each other and have the flat shape with a constant wall thickness, and the first portion may be recessed from the inner surface of the housing toward the outer surface of the housing and have a wall thickness that is less than the wall thickness of the support.

According to some embodiments, the second portion of the spacing portion may be formed over the entire side wall of the housing, and the side wall of the housing, on which the second portion of the spacing portion is formed, may have a uniform wall thickness.

According to some embodiments, the first portion of the spacing portion may form a first spacing gap that spaces a bottom surface of the battery cell apart from the bottom wall of the housing, and the second portion of the spacing portion may form a second spacing gap that spaces a side surface of the battery cell apart from the side wall of the housing.

According to some embodiments, the first and second spacing gaps may be connected to each other at the corner position of the housing and surround the corner position of the battery cell together.

According to some embodiments, the first spacing gap may be formed locally in a portion of the bottom wall of the housing, and the second spacing gap may be formed over the entire side wall of the housing.

According to some embodiments, a side bar may be located between the corner positions of the battery cell and the housing together with the spacing portion.

According to some embodiments, the side bar may surround a bottom surface and a side surface of the battery cell.

According to some embodiments, the side bar may include: a first portion facing the first portion of the spacing portion and forming a width of the side bar; and a second portion facing the second portion of the spacing portion and forming a height of the side bar.

According to some embodiments, the spacing portion and the side bar may be provided at the corner position of the housing at which the spacing portion and the side bar overlap with each other.

According to some embodiments, the spacing portion and the side bar may overlap with each other but not completely overlap with each other.

According to some embodiments, the side bar may extend out of the first portion of the spacing portion.

According to some embodiments, the first portion of the side bar may include: an accommodation portion located within the first spacing gap formed by the first portion of the spacing portion; and a position fixing portion on the support of the bottom wall that is out of the first portion of the spacing portion.

According to some embodiments, the accommodation portion may be supported while floating within the first spacing gap formed by the first portion of the spacing portion.

According to some embodiments, the position fixing portion may be supported between the support of the bottom wall, which is formed at the position out of the first portion of the spacing portion, and a bottom surface of the battery cell, while being in contact with the support of the bottom wall and the bottom surface of the battery cell.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
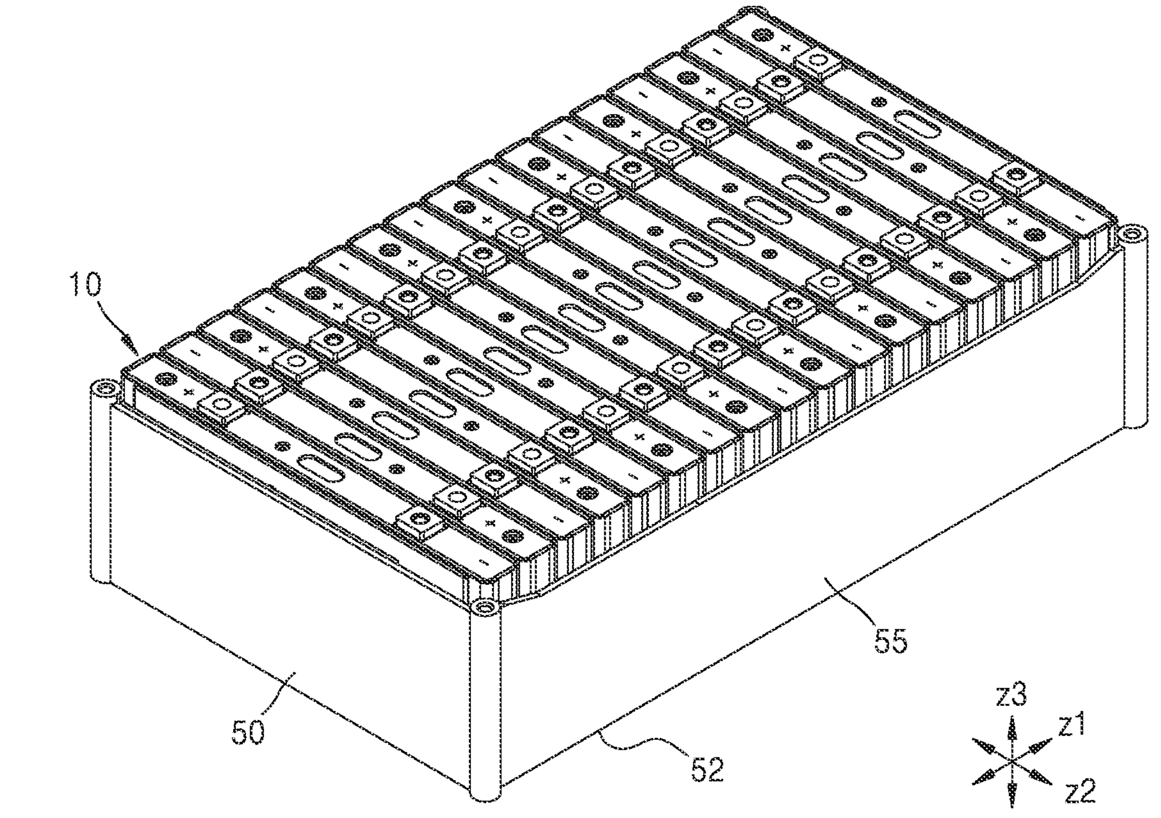
FIG. 1 is a perspective view of a battery pack according to some embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in more detail with reference to the accompanying drawings.

FIG. 1 is a perspective view of a battery pack according to some embodiments.

Figure 2:
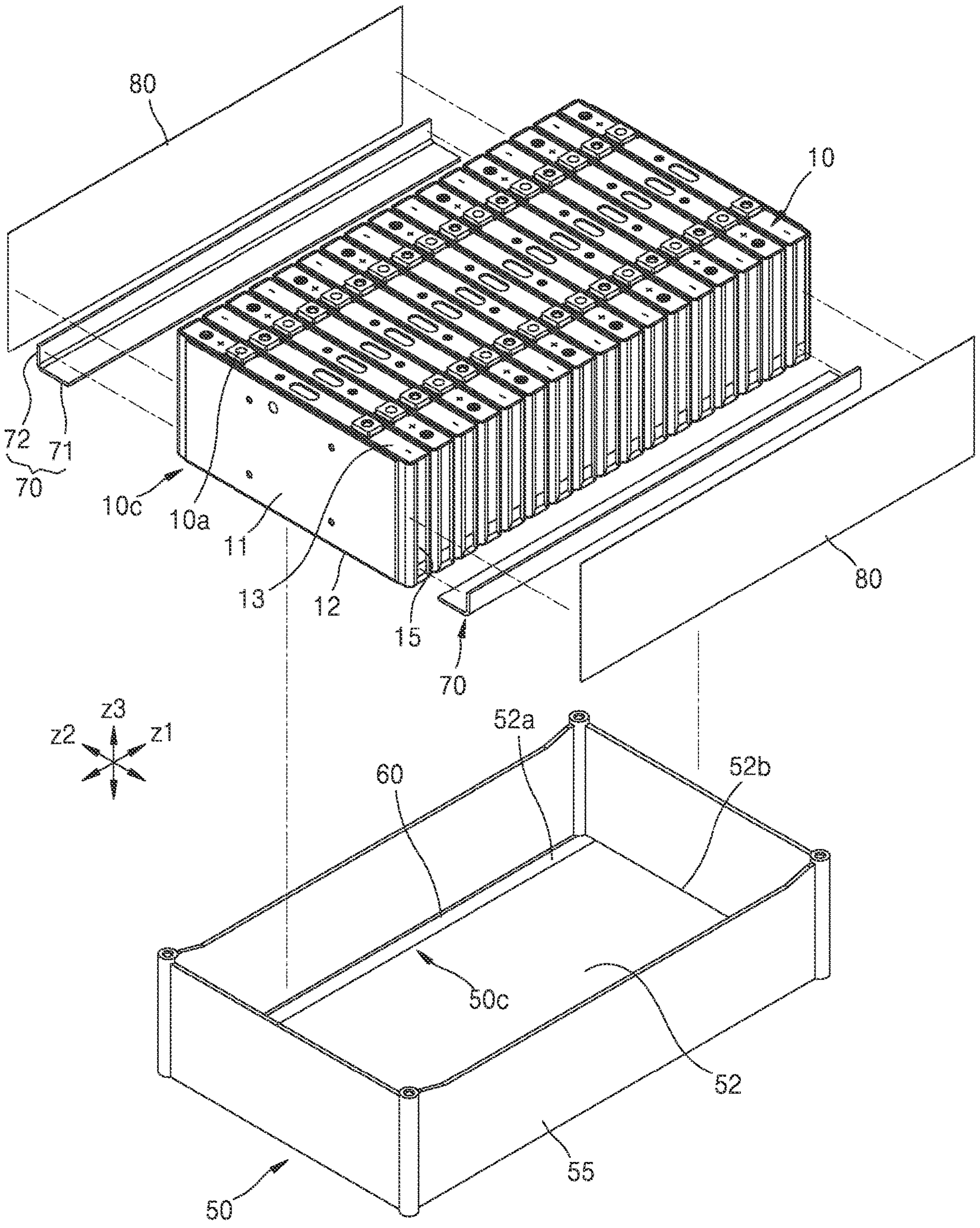
FIG. 2 is an exploded perspective view of the battery pack illustrated in FIG. 1.

FIG. 2 is an exploded perspective view of the battery pack illustrated in FIG. 1.

Figure 3:
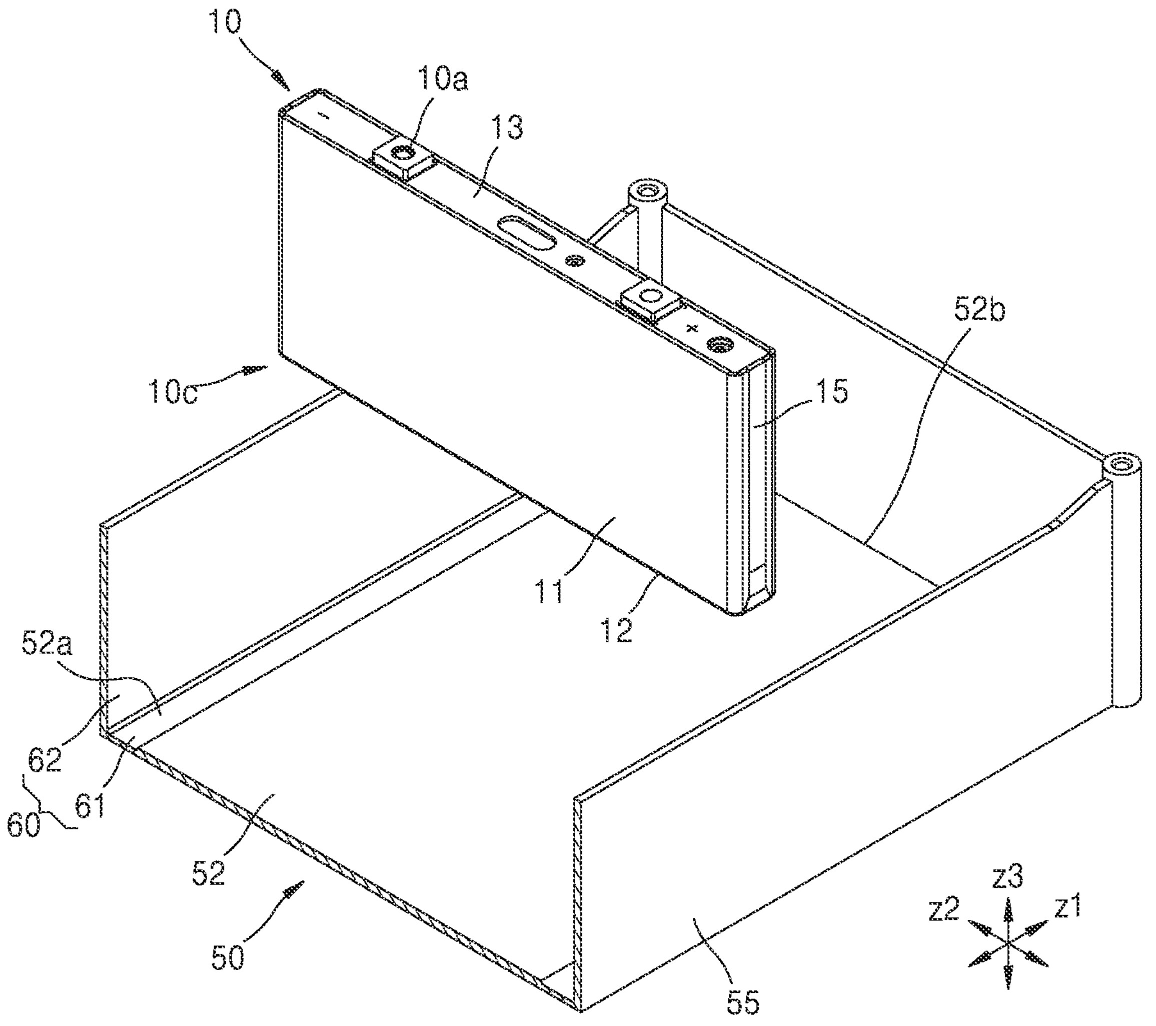
FIG. 3 is a view for explaining the corresponding surfaces of a housing and a battery cell accommodated in a housing illustrated in FIG. 2.

FIG. 3 is a view for explaining the corresponding surfaces of a housing and a battery cell accommodated in a housing illustrated in FIG. 2.

Figure 4:
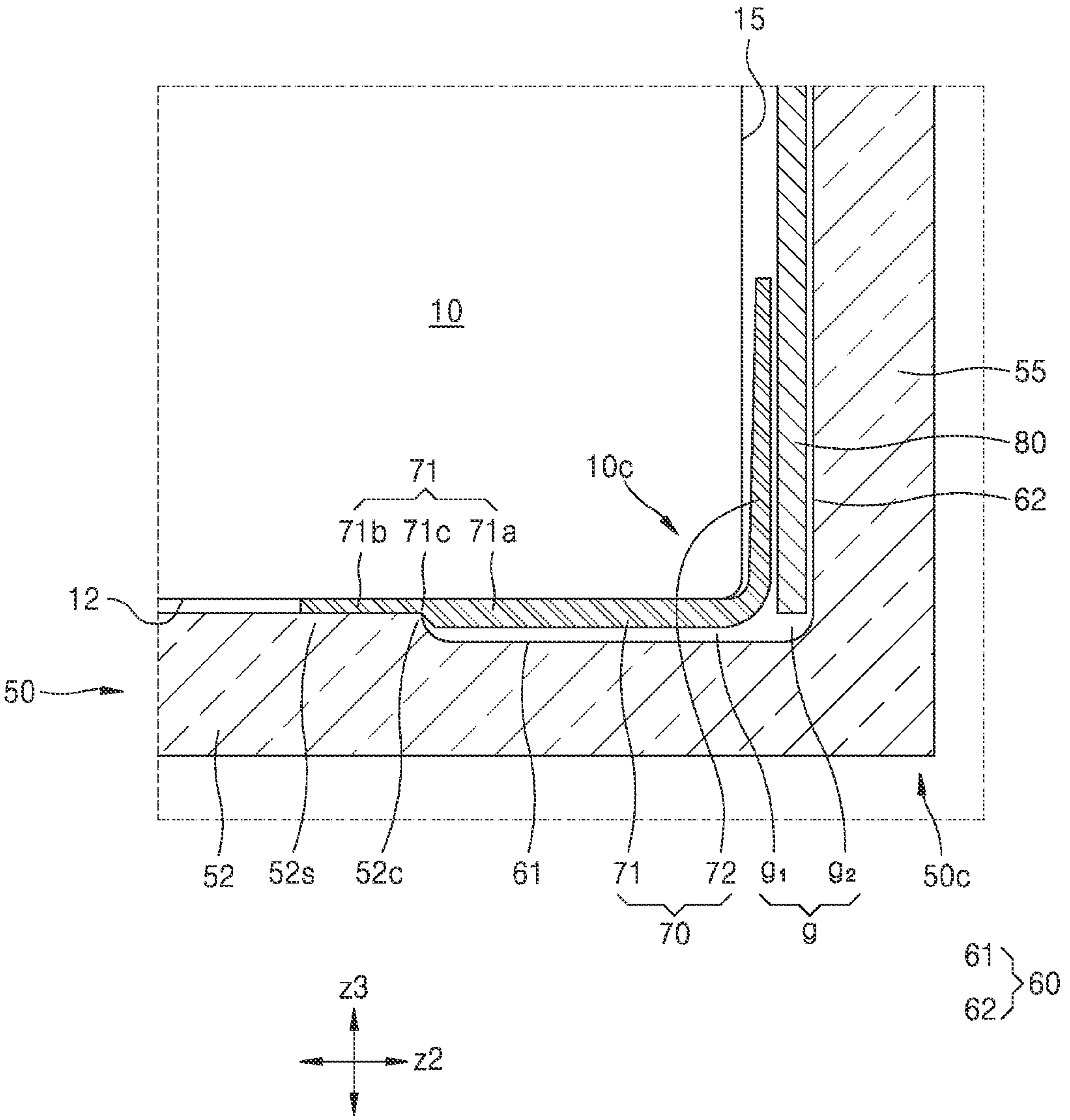
FIG. 4 is a cross-sectional view of the housing illustrated in FIG. 2.

FIG. 4 is a cross-sectional view of the housing illustrated in FIG. 2.

Figure 5:
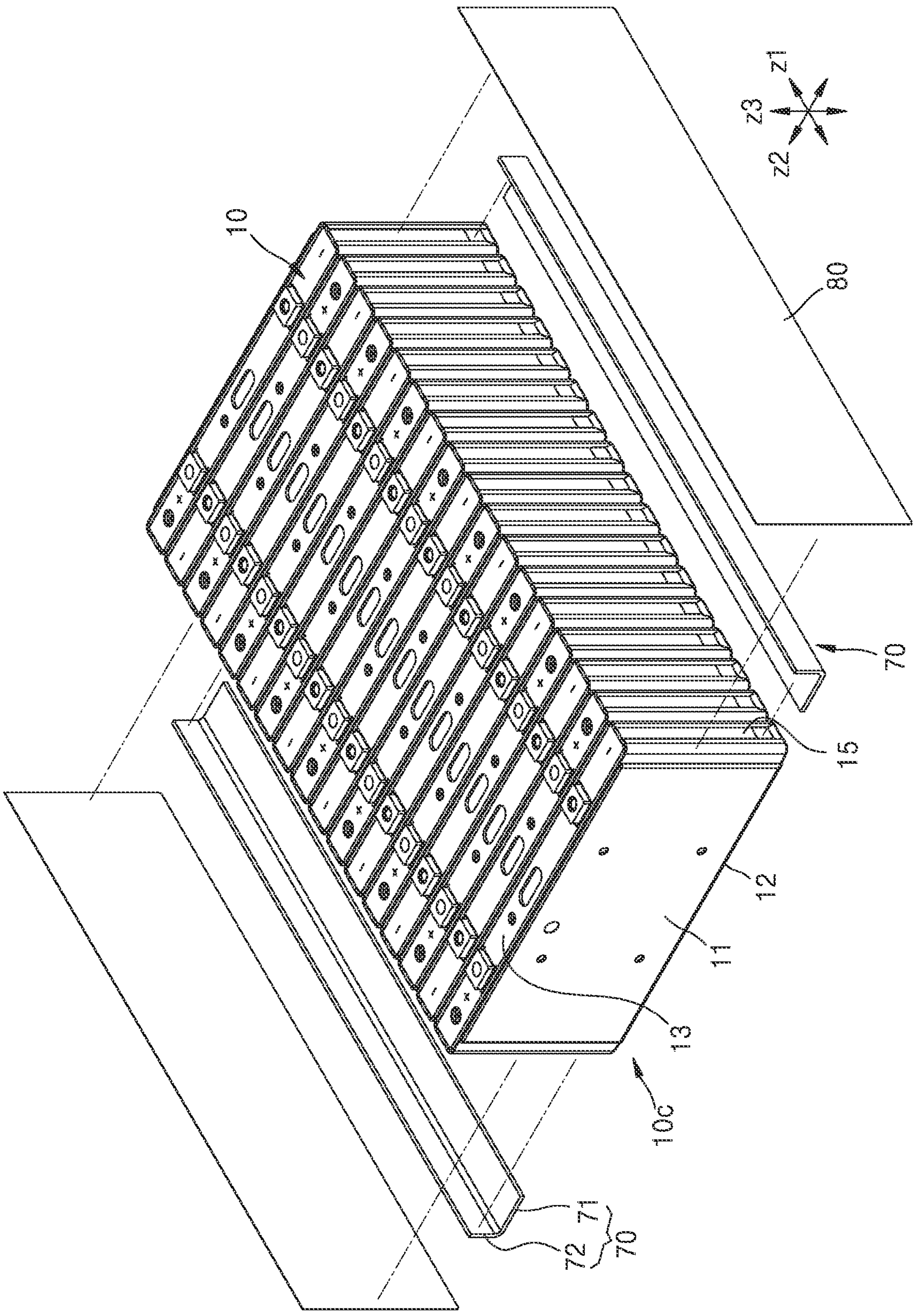
FIG. 5 is a perspective view illustrating the arrangement of a side bar and an insulating sheet illustrated in FIG. 4.

FIG. 5 is a perspective view illustrating the arrangement of a side bar and an insulating sheet illustrated in FIG. 4.

Referring to the drawings, a battery pack according to some embodiments of the present disclosure includes a plurality of battery cells 10; and a housing 50 providing an accommodation space for accommodating the plurality of battery cells 10 and including a side wall 55 and a bottom wall 52 which are in contact with each other at a corner position 50*c* that faces a corner position 10*c* of each of the battery cells 10, the housing 50 including a spacing portion 60, which is concavely recessed at least from the bottom wall 52 of the housing 50 to space the corner positions 10*c* and 50*c* of the battery cell 10 and the housing 50 apart from each other.

According to some embodiments, the battery cell 10 may include a plurality of battery cells 10. For example, the battery cell 10 may include a plurality of battery cells 10 arranged in a first direction Z1. Throughout this specification, the first direction Z1 may mean a direction in which the plurality of battery cells 10 are arranged. According to some embodiments, the plurality of battery cells 10 may include battery cells 10 arranged in one row in the first direction Z1. In various embodiments, the battery cell 10 may include a plurality of battery cells 10, wherein the battery cells 10 arranged in one row in the first direction Z1 are arranged in a plurality of rows in a second direction Z2 intersecting with the first direction Z1. According to some embodiments, the second direction Z2 is a direction intersecting with the first direction Z1 and may correspond to a direction perpendicularly intersecting with the first direction Z1.

The battery cell 10 may include: a terminal surface 13 on which an electrode terminal 10*a* is formed; a bottom surface 12 on the opposite side from the terminal surface 13; a first side surface 11 connecting the terminal surface 13 to the bottom surface 12 and having a relatively large area; and a second side surface 15 connecting the terminal surface 13 to the bottom surface 12 and having a relatively small area.

According to some embodiments, the battery cell 10 may include a case and an electrode assembly accommodated in the case, and an electrolyte may be accommodated in the housing 50 together with the electrode assembly. According to some embodiments, the electrode assembly may include first and second electrode plates having different polarities, and a separator interposed between the first and second electrode plates. The electrode assembly may be formed in a winding configuration, in which a stack having a separator interposed between the first and second electrode plates is wound in a rolled shape, or a stacking configuration, in which a plurality of first and second electrode plates are stacked with separators interposed therebetween. The first and second electrode plates of the electrode assembly may be respectively connected to electrode terminals 10*a* having different polarities formed on the terminal surface 13 of the battery cell 10. Through the electrode terminals 10*a*, discharge power of the electrode assembly may be output, or charge power may be input to the electrode assembly.

The electrode assembly may be accommodated in the case of the battery cell 10. According to some embodiments, the case is to form exterior surfaces of the battery cell 10. For example, the terminal surface 13, the bottom surface 12, the first side surface 11, and the second side surface 15 of the battery cell 10 may correspond to a terminal surface 13, a bottom surface 12, a first side surface 11, and a second side surface 15 of the case that form the exterior surfaces of the battery cell 10. For example, the terminal surface 13, the bottom surface 12, the first side surface 11, and the second side surface 15 may mean the terminal surface 13, the bottom surface 12, the first side surface 11, and the second side surface 15 of the battery cell 10 or the terminal surface 13, the bottom surface 12, the first side surface 11, and the second side surface 15 of the case that form the exterior surfaces of the battery cell 10.

The electrode terminal 10*a* of the battery cell 10 may be formed on the terminal surface 13, and the terminal surface

13 and the bottom surface 12 facing the terminal surface 13 may face each other in a third direction Z3. Throughout this specification, the third direction Z3 may correspond to a direction intersecting with the first and second directions Z1 and Z2 and may correspond to a direction perpendicularly intersecting with the first and second directions Z1 and Z2. The third direction Z3 may correspond to a direction in which the terminal surface 13 faces the bottom surface 12 or may correspond to a direction in which the electrode terminal 10*a* protrudes from the terminal surface 13. The bottom surface 12 of the battery cell 10 may face a bottom wall 52 of the housing 50 that accommodates the plurality of battery cells 10, the bottom surface 12 of the battery cell 10 and the bottom wall 52 of the housing 50 may face each other in the third direction Z3, and the plurality of battery cells 10 may be propped up and supported by the bottom wall 52 of the housing 50. As described later, the spacing portion 60 recessed downward in the third direction Z3 may be formed in the bottom wall 52 of the housing 50, and the spacing portion 60 may have a shape recessed at least downward so that the bottom surface 12 of the battery cell 10 and the bottom wall 52 of the housing 50, which face each other, are spaced apart from each other at the corner position 10*c* of the battery cell 10 and the corner position 50*c* of the housing 50, which face each other.

The first side surface 11 connects the terminal surface 13 of the battery cell 10 to the bottom surface 12 and may have a relatively large area. According to some embodiments, the battery cells 10 adjacent to each other in the first direction Z1 may be arranged such that the first side surfaces 11 face each other in the first direction Z1. The battery cells 10, in which the first side surfaces 11 having relatively large areas are adjacent to each other, face each other, and thus, the plurality of battery cells 10 arranged in the first direction Z1 may be stably supported by each other. According to some embodiments, the first side surfaces 11 may include a pair of first side surfaces 11 that face each other in the first direction Z1 in which the battery cells 10 are arranged. The second side surface 15 connects the terminal surface 13 of the battery cell 10 to the bottom surface 12 and may have a relatively small area. According to some embodiments, the second side surfaces 15 may include a pair of second side surfaces 15 that face each other in the second direction Z2.

The plurality of battery cells 10 may be accommodated in the housing 50 that provides an accommodation space for the plurality of battery cells 10. The housing 50 may include the side wall 55 facing the second side surface 15 of the battery cell 10 and the bottom wall 52 facing the bottom surface 12 of the battery cell 10, and an opening that forms an open accommodation space for accommodating the plurality of battery cells 10 may be formed at a position facing the bottom wall 52 in the third direction Z3. The plurality of battery cells 10 may be accommodated in the accommodation space of the housing 50 through the opening.

Referring to FIGS. 3 and 4, the housing 50, which provides the accommodation space for accommodating the plurality of battery cells 10, may include the bottom wall 52 that has a long side 52*a* and a short side 52*b* extending in the first and second directions Z1 and Z2, respectively. The plurality of battery cells 10 may be propped up and supported by the bottom wall 52. The spacing portion 60 is recessed downward along the long side 52*a* of the bottom wall 52 of the housing 50 so that the bottom wall 52 of the housing 50 and the bottom surface 12 of the battery cell 10 are spaced apart from each other in the third direction Z3 intersecting with the first and second directions Z1 and Z2.

For example, according to some embodiments, the spacing portion 60 recessed downward in the third direction Z3 may be formed in the bottom wall 52 of the housing 50 that accommodates the plurality of battery cells 10. The spacing portion 60 faces the corner position 10*c*, at which the bottom surface 12 of the battery cell 10 is in contact with the second side surface 15, and may surround the bottom surface 12 and the second side surface 15 of the battery cell 10 that are in contact with each other. For example, according to some embodiments, the spacing portion 60 may be formed at the corner position 50*c* of the housing 50 so as to face the corner position 10*c* at which the bottom surface 12 of the battery cell 10 is in contact with the second side surface 15. According to some embodiments, the corner position 10*c*, at which the bottom surface 12 of the battery cell 10 is in contact with the second side surface 15, may face the corner position 50*c*, at which the bottom wall 52 of the housing 50 is in contact with the side wall 55. The spacing portion 60 may be formed at the corner position 50*c* of the housing 50 that faces the corner position 10*c* of the battery cell 10.

According to some embodiments, that the spacing portion 60 faces the corner position 10*c* of the battery cell 10 may mean that the spacing portion 60 is formed at the corner position 50*c* of the housing 50 that faces the corner position 10*c* of the battery cell 10. A portion of the spacing portion 60 may be formed at the position facing the bottom surface 12 of the battery cell 10, and the other portion of the spacing portion 60 may be formed at the position facing the second side surface 15 of the battery cell 10. That is, according to some embodiments, the spacing portion 60 may be formed at the positions facing both the bottom surface 12 and the second side surface 15 of the battery cell 10, in other words, at the corner position 50*c* of the housing 50.

According to some embodiments, the spacing portion 60 may include a first portion 61 formed at a position facing the bottom surface 12 of the battery cell 10 and a second portion 62 formed at a position facing the second side surface 15 of the battery cell 10.

The first portion 61 of the spacing portion 60 may be formed at a position facing the bottom surface 12 of the battery cell 10 and, for example, may be formed on the inner surface of the bottom wall 52 of the housing 50 that faces the bottom surface 12 of the battery cell 10. According to some embodiments, the bottom wall 52 of the housing 50 may correspond to a wall body of the housing 50 that surrounds an accommodation space to form the accommodation space for accommodating the plurality of battery cells 10 and, for example, may be a wall body of the housing 50 that faces the bottom surface 12 of the battery cell 10. That is, according to some embodiments, the bottom wall 52 of the housing 50 means a wall body of the housing 50 rather than a surface thereof. For example, the bottom wall 52 of the housing 50 may include both the inner and outer surfaces that include the inner surface facing the battery cell 10 and the outer surface on the opposite side from the battery cell 10, and the first portion 61 of the spacing portion 60 may be formed on the inner surface of the bottom wall 52 that faces the battery cell 10. For example, according to some embodiments, the first portion 61 of the spacing portion 60 may be formed on the inner surface of the bottom wall 52, and may be formed on a portion of the inner surface of the bottom wall 52 or formed over the entire inner surface of the bottom wall 52. According to some embodiments, the first portion 61 of the spacing portion 60 may be formed on a limited portion of the inner surface of the bottom wall 52 and, for example, may be formed on a limited portion of the inner surface of the bottom wall 52 adjacent to the corner position 50*c* of the housing 50. According to some embodiments, that the first portion 61 of the spacing portion 60 is formed on the bottom wall 52 may mean that the first portion 61 of the spacing portion 60 forms the inner surface of the bottom wall 52. That is, according to some embodiments, that the first portion 61 of the spacing portion 60 is formed on a portion of the inner surface of the bottom wall 52 may mean that the first portion 61 of the spacing portion 60 forms a portion of the inner surface of the bottom wall 52 and is continuously connected to the other portion of the inner surface of the bottom wall 52, and accordingly, the entire inner surface of the bottom wall 52 is formed. Here, according to some embodiments, the first portion 61 of the spacing portion 60 may form the one portion of the inner surface of the bottom wall 52, with a shape recessed downward from the other portion of the inner surface of the bottom wall 52. According to some embodiments, the first portion 61 of the spacing portion 60 may be distinguished from the bottom wall 52 of the housing 50. The bottom wall 52 of the housing 50 may mean a wall body of the housing 50 that surrounds the accommodation space, but the first portion 61 of the spacing portion 60, which forms the inner surface of the bottom wall 52 of the housing 50, is concavely recessed downward and forms a first spacing gap $g_1$ from the bottom surface 12 of the battery cell 10 to provide cushioning for the bottom surface 12 of the battery cell 10. In this functional aspect, the first portion 61 of the spacing portion 60 may be understood as being different from the bottom wall 52 of the housing 50 even if the first portion 61 of the spacing portion 60 forms the inner surface of the bottom wall 52.

The second portion 62 of the spacing portion 60 may be formed at a position facing the second side surface 15 of the battery cell 10 and, for example, may be formed on the inner surface of the side wall 55 of the housing 50 that faces the second side surface 15 of the battery cell 10. According to some embodiments, the side wall 55 of the housing 50 may correspond to a wall body of the housing 50 that surrounds an accommodation space to form the accommodation space for accommodating the plurality of battery cells 10 and, for example, may be a wall body of the housing 50 that faces the second side surface 15 of the battery cell 10. That is, according to some embodiments, the side wall 55 of the housing 50 means a wall body of the housing 50 rather than a surface thereof. For example, the side wall 55 of the housing 50 may include both the inner and outer surfaces that include the inner surface facing the battery cell 10 and the outer surface on the opposite side from the battery cell 10, and the second portion 62 of the spacing portion 60 may be formed on the inner surface of the side wall 55 that faces the battery cell 10. For example, according to some embodiments, the second portion 62 of the spacing portion 60 may be formed on the inner surface of the side wall 55, and may be formed on a portion of the inner surface of the side wall 55 or formed over the entire inner surface of the side wall 55. According to some embodiments, the second portion 62 of the spacing portion 60 may be formed over the entire inner surface of the side wall 55 and, for example, may be formed over the entire inner surface of the side wall 55 from the inner surface of the side wall 55 adjacent to the corner position 50*c* of the housing 50. According to some embodiments, that the second portion 62 of the spacing portion 60 is formed on the side wall 55 may mean that the second portion 62 of the spacing portion 60 forms the inner surface of the side wall 55. That is, according to some embodiments, that the second portion 62 of the spacing portion 60 is formed on the entire inner surface of the side wall 55 may mean that the second portion 62 of the spacing portion 60 forms the entire inner surface of the side wall 55, and accordingly, the inner surface of the side wall 55 is entirely spaced apart from the second side surface 15 of the battery cell 10. According to some embodiments, the second portion 62 of the spacing portion 60 may be formed over the entire inner surface of the side wall 55 while extending continuously from the first portion 61 of the spacing portion 60 formed at the corner position 50*c* of the housing 50. According to some embodiments, the side wall 55 of the housing 50 may mean a wall body of the housing 50 that surrounds the accommodation space, but the second portion 62 of the spacing portion 60, which forms the inner surface of the side wall 55 of the housing 50, forms a second spacing gap $g_2$ from the second side surface 15 of the battery cell 10 to provide cushioning for the second side surface 15 of the battery cell 10. In this functional aspect, the second portion 62 of the spacing portion 60 may be understood as being different from the side wall 55 of the housing 50 even if the second portion 62 of the spacing portion 60 forms the inner surface of the side wall 55.

The spacing portion 60 may extend from a position facing one of the bottom surface 12 and the second side surface 15 of the battery cell 10 to a position facing the other. Here, that the spacing portion 60 extends from one side to the other side may mean that, according to some embodiments, the spacing portion 60 extends from the first portion 61 facing the bottom surface 12 of the battery cell 10 to the second portion 62 facing the second side surface 15 of the battery cell 10. According to some embodiments, the spacing portion 60 extends from the first portion 61 facing the bottom surface 12 of the battery cell 10 to the second portion 62 facing the second side surface 15 of the battery cell 10, and the second portion 62 of the spacing portion 60 may extend entirely through the second side surface 15 of the battery cell 10. For example, according to some embodiments, the spacing portion 60 may extend from the first portion 61 facing the bottom surface 12 of the battery cell 10 toward the second portion 62 facing the second side surface 15 of the battery cell 10, and here, the second portion 62 facing the second side surface 15 of the battery cell 10 may be formed entirely over the second side surface 15 of the battery cell 10.

According to some embodiments, the spacing portion 60, which is formed at the corner position 50*c* of the housing 50 that faces the corner position 10*c* of the battery cell 10, may include the first portion 61 facing the bottom surface 12 of the battery cell 10 and the second portion 62 facing the second side surface 15 of the battery cell 10. Here, the first portion 61 of the spacing portion 60 may form the inner surface of the bottom wall 52 of the housing 50 and form the first spacing gap $g_1$ from the bottom surface 12 of the battery cell 10 to the inner surface of the bottom wall 52 of the housing 50, and the second portion 62 of the spacing portion 60 may form the inner surface of the side wall 55 of the housing 50 and form the second spacing gap $g_2$ from the second side surface 15 of the battery cell 10 to the inner surface of the side wall 55 of the housing 50. Also, the first and second spacing gaps $g_1$ and $g_2$ may be connected to each other to surround the corner position 10*c* of the battery cell 10.

According to some embodiments, a spacing gap g allows the edges of the battery cell 10 and the housing 50, which are formed at the corner positions 10*c* and 50*c* of the battery cell 10 and the housing 50, for example, at the corner position 10*c* of the battery cell 10 and the corner position 50*c* of the housing 50, to be spaced apart from each other, and may provide cushioning between the battery cell 10 and the housing 50 so as to protect the battery cell 10 from external impact. More specifically, the first spacing gap $g_1$ may cushion the battery cell 10 from falling impact, and the second spacing gap $g_2$ may cushion the battery cell 10 from laterally applied external impact. According to some embodiments, the first spacing gap $g_1$ may be provided from the first portion 61 of the spacing portion 60 and formed between the bottom surface 12 of the battery cell 10 and the bottom wall 52 of the housing 50, which face each other, and the second spacing gap $g_2$ may be provided from the second portion 62 of the spacing portion 60 and formed between the second side surface 15 of the battery cell 10 and the side wall 55 of the housing 50, which face each other. Hereinafter, referring to FIG. 4, the spacing portion 60 and the spacing gap g provided by the spacing portion 60 will be described in more detail.

The spacing portion 60 facing the corner position 10*c* of the battery cell 10 may be formed at the corner position 50*c* at which the bottom wall 52 of the housing 50 is in contact with the side wall 55. More specifically, the spacing portion 60 may be formed at the corner position 50*c* at which the bottom wall 52 of the housing 50 is in contact with the side wall 55, and the spacing portion 60 formed at the corner position 50*c* may face the corner position 10*c* of the battery cell 10, in other words, the corner position 10*c* at which the second side surface 15 of the battery cell 10 is in contact with the bottom surface 12.

According to some embodiments, the spacing portion 60 may include the first portion 61 facing the bottom surface 12 of the battery cell 10 and the second portion 62 facing the second side surface 15 of the battery cell 10, and the first and second portions 61 and 62 of the spacing portion 60 may be connected to each other. That is, according to some embodiments, the first and second portions 61 and 62 of the spacing portion 60 may be connected to each other and surround the bottom surface 12 and the second side surface 15 of the battery cell 10.

The first portion 61 of the spacing portion 60 may be formed on the bottom wall 52 of the housing 50, allow the bottom wall 52 of the housing 50 and the bottom surface 12 of the battery cell 10, which face each other in the third direction Z3, to be spaced apart from each other, and form the first spacing gap $g_1$ between the bottom wall 52 of the housing 50 and the bottom surface 12 of the battery cell 10. The first spacing gap $g_1$ may allow the bottom wall 52 of the housing 50 and the bottom surface 12 of the battery cell 10, which face each other, to be spaced apart from each other, thereby absorbing unintended interaction between the bottom wall 52 of the housing 50 and the bottom surface 12 of the battery cell 10. For example, the first spacing gap $g_1$ may prevent or reduce physical interference between the bottom wall 52 of the housing 50 and the bottom surface 12 of the battery cell 10, thereby protecting the battery cell 10 from external impact and cushioning external impact transmitted from the bottom wall 52 of the housing 50 to the battery cell 10. Also, the first spacing gap $g_1$ may prevent or reduce, for example, insulation breakdown, such as tearing of an insulation coating formed on the bottom surface 12 of the battery cell 10. Here, the tearing is caused by the physical interference due to external impact between the bottom wall 52 of the housing 50 and the bottom surface 12 of the battery cell 10. In addition, the first spacing gap $g_1$ may secure electrical insulation between the bottom wall 52 of the housing 50 and the bottom surface 12 of the battery cell 10.

That is to say, the first spacing gap $g_1$ may prevent or reduce physical interference and electrical interference between the bottom wall 52 of the housing 50 and the bottom surface 12 of the battery cell 10, and thus, it is possible to protect the battery cell 10 from the external environment by preventing or reducing the electrical interference and the physical interference. More specifically, it is possible to ensure the normal driving of the battery cell 10 and prevent or reduce physical damage to the battery cell 10 by eliminating the electrical interference or physical interference from the outside.

According to some embodiments, the first portion 61 of the spacing portion 60 may form the first spacing gap $g_1$ between the bottom wall 52 of the housing 50 and the bottom surface 12 of the battery cell 10, which face each other in the third direction Z3. According to some embodiments, the first portion 61 of the spacing portion 60 may be formed on the inner surface of the bottom wall 52 of the housing 50, which faces the battery cell 10, and may have a shape recessed toward the outer surface of the bottom wall 52, that is to say, have a shape recessed downward from the inner surface of the housing 50 facing the battery cell 10 toward the outer surface of the housing 50. According to some embodiments, the bottom wall 52 of the housing 50 may substantially have a constant thickness, including the inner surface and the outer surface, which extend parallel to each other. The bottom wall 52 of the housing 50 may substantially have a constant thickness. The inner surface of the bottom wall 52 is recessed toward the outer surface in the first portion 61 of the spacing portion 60, and the bottom wall 52 having a relatively small thickness may be formed in the first portion 61 of the spacing portion 60. Accordingly, the first spacing gap $g_1$ may be formed in a concavely recessed shape on the inner surface of the bottom wall 52 on which the first portion 61 of the spacing portion 60 is formed.

Thus, according to some embodiments, the bottom wall 52 may be formed in a flat shape in which the inner and outer surfaces thereof are parallel to each other, and may substantially have a constant wall thickness. Also, the inner surface of the bottom wall 52 is recessed toward the outer surface in the first portion 61 of the spacing portion 60, and thus, the relatively small wall thickness may be formed. The first spacing gap $g_1$ having a recessed shape may be formed on the inner surface of the bottom wall 52 corresponding to the first portion 61, and the outer surface of the bottom wall 52 may be formed entirely flat at an inner position corresponding to the first portion 61 and at an outer position out of the first portion 61. That is, according to some embodiments, the first portion 61 of the spacing portion 60 and the first spacing gap $g_1$ provided by the first portion 61 may be formed on the inner surface of the bottom wall 52 that faces the battery cell 10, and the outer surface of the bottom wall 52 may be formed entirely flat. The first portion 61 is to provide the first spacing gap $g_1$ between the bottom wall 52 of the housing 50 and the bottom surface 12 of the battery cell 10, and the first portion 61 of the spacing portion 60 may be formed on the inner surface of the bottom wall 52 that faces the battery cell 10.

The spacing portion 60 may extend from the bottom wall 52 of the housing 50 toward the side wall 55, and may extend continuously from the first portion 61, which is formed on the bottom wall 52 of the housing 50, toward the second portion 62, which is formed on the side wall 55. Here, the spacing portion 60 may include the first portion 61 formed on the bottom wall 52 of the housing 50 and the second portion 62 formed on the side wall 55 of the housing 50. The first and second portions 61 and 62 of the spacing portion 60 may be formed at the corner position 50*c* of the housing 50 while being in contact with and connected to each other at the corner position 50$c$ of the housing 50, and may surround the corner position 10$c$ of the battery cell 10 together at the corner position 50$c$ of the housing 50.

According to some embodiments, the second portion 62 of the spacing portion 60 may be formed on the side wall 55 of the housing 50, allow the side wall 55 of the housing 50 and the second side surface 15 of the battery cell 10, which face each other in the second direction Z2, to be spaced apart from each other, and form the second spacing gap $g_2$ between the side wall 55 of the housing 50 and the second side surface 15 of the battery cell 10. The second spacing gap $g_2$ may allow the side wall 55 of the housing 50 and the second side surface 15 of the battery cell 10, which face each other, to be spaced apart from each other, thereby absorbing unintended interaction between the side wall 55 of the housing 50 and the second side surface 15 of the battery cell 10. For example, the second spacing gap $g_2$ may prevent or reduce physical interference due to external impact between the side wall 55 of the housing 50 and the second side surface 15 of the battery cell 10 and prevent or reduce insulation breakdown, such as tearing of an insulation coating formed on the second side surface 15 of the battery cell 10. Here, the tearing is caused by the physical interference due to external impact between the side wall 55 of the housing 50 and the second side surface 15 of the battery cell 10. In addition, the second spacing gap $g_2$ may secure electrical insulation therebetween. That is, the second spacing gap $g_2$ may prevent or reduce physical interference between the side wall 55 of the housing 50 and the second side surface 15 of the battery cell 10, thereby protecting the battery cell 10 from external impact and cushioning external impact transmitted from the side wall 55 of the housing 50 to the battery cell 10. That is to say, the second spacing gap $g_2$ may prevent or reduce physical interference and electrical interference between the side wall 55 of the housing 50 and the second side surface 15 of the battery cell 10, and thus, it is possible to protect the battery cell 10 from the external environment by preventing or reducing the physical interference and the electrical interference. More specifically, it is possible to ensure the normal driving of the battery cell 10 and prevent or reduce physical damage to the battery cell 10 by eliminating the physical interference or electrical interference.

According to some embodiments, the second portion 62 of the spacing portion 60 may form the second spacing gap $g_2$ between the side wall 55 of the housing 50 and the second side surface 15 of the battery cell 10, which face each other in the second direction Z2. To this end, the second portion 62 of the spacing portion 60 may be formed on the inner surface, facing the battery cell 10, of the side wall 55 of the housing 50.

The second portion 62 of the spacing portion 60 may form an entirely flat inner surface of the side wall 55 unlike the first portion 61. According to some embodiments, the side wall 55 of the housing 50 may have an entirely uniform wall thickness, including the inner surface and the outer surface, which extend parallel to each other. As described above, unlike the second portion 62 of the spacing portion 60, which includes the inner surface and the outer surface extending entirely parallel to each other and has an entirely uniform wall thickness, the first portion 61 of the spacing portion 60 has a shape in which the inner surface of the bottom wall 52 facing the battery cell 10 is concavely recessed toward the outer surface, and thus, a portion of the bottom wall 52 may have a locally small wall thickness. That is to say, the side wall 55 of the housing 50, on which the second portion 62 of the spacing portion 60 unlike the first portion 61 of the spacing portion 60 is formed, may have an entirely uniform wall thickness. The side wall 55 has the entirely uniform wall thickness, and thus, the inner surface thereof may be entirely spaced apart from the second side surface 15 of the battery cell 10. The second spacing gap $g_2$ may be formed between the second side surface 15 of the battery cell 10 and the side wall 55 of the housing 50, which face each other through the second portion 62 formed on the entire inner surface of the side wall 55. That is, according to some embodiments, a portion of the inner surface of the bottom wall 52 may be locally concavely recessed in the first portion 61 of the spacing portion 60. The inner surface of the bottom wall 52 is not formed flat, but a portion of the inner surface is locally concavely recessed toward the flat outer surface. Therefore, the first spacing gap $g_1$ may be formed on a limited portion of the inner surface of the bottom wall 52 that corresponds to the first portion 61 of the spacing portion 60. In the second portion 62 of the spacing portion 60 unlike the first portion 61, the entire inner surface of the side wall 55 is formed flat. Accordingly, the second spacing gap $g_2$ may be formed entirely over the side wall 55 that corresponds to the second portion 62 of the spacing portion 60. According to some embodiments, the first portion 61 of the spacing portion 60 may be formed locally on a portion of the inner surface of the bottom wall 52, adjacent to the corner position 50$c$ of the housing 50, among the inner surface of the bottom wall 52 that faces the battery cell 10. The second portion 62 of the spacing portion 60 may be formed entirely over the side wall 55 that faces the battery cell 10. According to some embodiments, the bottom wall 52 of the housing 50 may have a non-uniform wall thickness across the first portion 61 of the spacing portion 60, in other words, at the inner position at which the first portion 61 is formed and the outer position out of the first portion 61. The side wall 55 of the housing 50 may have a uniform wall thickness across the second portion 62 of the spacing portion 60, in other words, entirely over the side wall 55.

According to some embodiments, the spacing portion 60 may be formed at the corner position 50$c$, at which the side wall 55 and the bottom wall 52 of the housing 50 are in contact with each other, among the inner surface of the housing 50 that faces the corner position 10$c$ of the battery cell 10. The first and second spacing gaps $g_1$ and $g_2$ are provided between the housing 50 and the bottom surface 12 and the second side surface 15 of the battery cell 10, thereby preventing or reducing physical interference or electrical interference with respect to the bottom surface 12 and the second side surface 15 of the battery cell 10.

According to some embodiments, the spacing portion 60, which is intended to prevent or reduce the physical interference and electrical interference with respect to the bottom surface 12 and the second side surface 15 of the battery cell 10, and the spacing gap g formed by the spacing portion 60 may be provided at the corner positions 10$c$ and 50$c$ of the battery cell 10 and the housing 50, where the possibility of the physical and electrical interference between the battery cell 10 and the housing 50 is high. For example, the battery cell 10 and the housing 50 are highly likely to physically come into contact with each other at the corner positions 10$c$ and 50$c$ while forming protruding edges with respect to each other. For example, the corner position 10$c$ of the battery cell 10 and the corner position 50$c$ of the housing 50, which face each other, may come into contact with each other due to the external impact, and the physical interference and the electrical interference may occur therebetween. For example, the corner position 50$c$ of the housing 50 and the corner position 10$c$ of the battery cell 10 form local stress concentration according to external impact while receiving impact through relatively narrow edges, and there is a possibility of intensive interaction with each other. For example, when falling impact is applied to the corner position 50*c* of the housing 50 that forms an edge with a relatively small area, compared to when falling impact is applied to the bottom wall 52 or the side wall 55 of the housing 50 having a relatively large area, the falling impact concentrates on the small area. Accordingly, the possibility that the corner position 50*c* of the housing 50 and the corner position 10*c* of the battery cell 10, which face each other, exchange intensive interaction, is increased due to the falling impact. That is, compared to other positions of the housing 50 forming the outer surface of the battery pack, there is a relatively high possibility that the housing 50 and the battery cell 10 are forced into close contact with each other at the corner position 50*c*, where the stress concentration is relatively high. For example, as the housing 50 and the battery cell 10 are forced into close contact with each other at the corner position 50*c* where stress concentration is relatively high for the same external impact, the possibility of physical interference and electrical interference increases. As a result, this may mean that physical impact and an electrical short-circuit between the housing 50 and the battery cell 10 are highly likely to occur. As described above, according to some embodiments, the spacing portion 60 for preventing or reducing the physical interference and the electrical interference between the battery cell 10 and the housing 50 is formed at the corner positions 10*c* and 50*c*, where the concentration of stress is relatively high. Accordingly, the interference therebetween is prevented or reduced at the corner positions 10*c* and 50*c* where close contact with each other is likely to be forced. Therefore, damage and malfunction of the battery cell 10 due to physical interference and electrical interference between the battery cell 10 and the housing 50 may be prevented or reduced.

The first and second spacing gaps $g_1$ and $g_2$ provided by the first and second portions 61 and 62 of the spacing portion 60 may be connected to each other at the corner position 50*c* of the housing 50. For example, the first and second spacing gaps $g_1$ and $g_2$ are formed on the bottom wall 52 and the side wall 55, which are adjacent to the corner position 50*c* of the housing 50, and may extend in the second direction Z2 parallel to the bottom wall 52 and in the third direction Z3 parallel to the side wall 55, respectively, while being in contact with each other at the corner position 50*c* of the housing 50. The first spacing gap $g_1$ may be limited to the first portion 61 of the spacing portion 60 corresponding to a portion of the bottom wall 52, rather than being formed entirely over the bottom wall 52. Unlike the first spacing gap $g_1$, the second spacing gap $g_2$ may be formed entirely over the side wall 55. For example, the first and second spacing gaps $g_1$ and $g_2$ may be connected to each other. The second spacing gap $g_2$ may be extend from the first spacing gap $g_1$ formed on the bottom wall 52 toward the side wall 55 and may be formed over the entire height of the side wall 55 in the third direction Z3 between the side wall 55 and the second side surface 15 of the battery cell 10. The second spacing gap $g_2$ may have a uniform width in the third direction Z3. The battery cell 10 and the bottom wall 52 may be spaced apart from each other at the corner position 50*c* where stress concentration is high by the first spacing gap $g_1$ partially formed on the bottom wall 52 of the housing 50, and the interference therebetween may be prevented or reduced. Also, the weight of the battery cell 10 may be propped up and supported by a support 52*s* of the bottom wall 52, in which the first spacing gap $g_1$ is excluded. Here, the support 52*s* of the bottom wall 52 may refer to a portion of the bottom wall 52 that props up and supports the bottom surface 12 of the battery cell 10 while being in contact with the bottom surface 12 of the battery cell 10 and, for example, may refer to a flat portion other than the first portion 61 that has the first spacing gap $g_1$ while being concavely recessed in the bottom wall 52. According to some embodiments, the support 52*s* may be formed flat with a constant wall thickness, including the inner surface and outer surface of the housing 50 extending parallel to each other. The first portion 61, in which the first spacing gap $g_1$ is formed, may be recessed from the inner surface of the housing 50 toward the outer surface and thus may have a wall thickness smaller than a wall thickness of the support 52*s*.

Unlike the bottom wall 52 on which the first spacing gap $g_1$ is formed as described above, the side wall 55, on which the spacing gap $g_2$ is formed, does not need to prop up and support the weight of the battery cell 10. Therefore, the second spacing gap $g_2$ may be formed entirely between the second side surface 15 of the battery cell 10 and the side wall 55 of the housing 50. The second spacing gap $g_2$ may space the battery cell 10 and the housing 50 apart from each other to prevent or reduce interference between the battery cell 10 and the housing 50, and may also provide a space for accommodating a second portion 72 of a side bar 70. According to some embodiments, an insulating sheet 80 may be accommodated together with the second portion 72 of the side bar 70 in the second spacing gap $g_2$.

According to some embodiments, the spacing portion 60 is formed at the corner position 50*c* where stress concentration is relatively high, and the side bar 70 is interposed between the corner positions 10*c* and 50*c* of the battery cell 10 and the housing 50. Therefore, it is possible to prevent or reduce interference between the corner positions 10*c* and 50*c* of the battery cell 10 and the housing 50, which are forced into close contact with each other. That is, according to some embodiments, in order to space the corner positions 10*c* and 50*c* of the battery cell 10 and the housing 50 apart from each other, which have relatively high stress concentration and thus are forced into close contact, the spacing portion 60 and the spacing gap g formed by the spacing portion 60 are provided. In addition, the side bar 70 is interposed between the battery cell 10 and the housing 50 for the purpose of preventing or reducing close contact with each other. Accordingly, it is possible to eliminate physical and electrical interference between the battery cell 10 and the housing 50 at the corner positions 10*c* and 50*c* by the spacing portion 60 and the side bar 70. According to some embodiments, the spacing portion 60 and the side bar 70 for preventing or reducing interference between the battery cell 10 and the housing 50 in different ways such as securing the spacing and preventing or reducing the contact may be formed between the corner positions 10*c* and 50*c* of the battery cell 10 and the housing 50. Here, the spacing portion 60 and the side bar 70 may be formed at positions corresponding to each other, in other words, at the corner position 50*c* of the housing 50 corresponding to each other. However, as will be described later, even if the spacing portion 60 and the side bar 70 are formed at the corner position 50*c* of the housing 50 corresponding to each other, the spacing portion 60 and the side bar 70 may not be formed at positions completely overlapping with each other.

According to some embodiments, the side bar 70 and the spacing portion 60 may be formed at the corner position 50*c* of the housing 50 overlapping with each other. According to some embodiments, the side bar 70 may include a first portion 71 facing the bottom wall 52 and a second portion 72 facing the side wall 55. The first portion 71 faces the bottom wall 52 and forms the width of the side bar 70, and may have a width greater than the first portion 61 of the spacing portion 60 formed on the bottom wall 52. The second portion 72 faces the side wall 55 and forms the height of the side bar 70, and may have a height less than the second portion 62 of the spacing portion 60 formed on the side wall 55. For example, the side bar 70 may have a height less than that of the second portion 62 of the spacing portion 60 formed on the entire side wall, in other words, may be formed locally over a partial height of the side wall 55, and may have a small height including the corner position 50*c* of the side wall 55. Throughout this specification, the width of the side bar 70 may be defined in the second direction Z2 parallel to the bottom wall 52, and the height of the side bar 70 may be defined in the third direction Z3 parallel to the side wall 55.

The side bar 70 may include the first portion 71 facing the bottom wall 52 of the housing 50 and the second portion 72 facing the side wall 55 of the housing 50. The first and second portions 71 and 72 are in contact with each other in a bent shape and may extend in a vertically bent shape to face the bottom wall 52 and the side wall 55 of the housing 50, respectively. According to some embodiments, the first and second portions 71 and 72 of the side bar 70 may face the bottom wall 52 and the side wall 55 of the housing 50, respectively, and more specifically, may face the first portion 61 of the spacing portion 60 formed on the bottom wall 52 and the second portion 62 of the spacing portion 60 formed on the side wall 55, respectively. Here, the first portion 71 of the side bar 70 and the first portion 61 of the spacing portion 60 may not be formed at positions completely overlapping with each other. Similarly, the second portion 72 of the side bar 70 and the second portion 62 of the spacing portion 60 may also be formed at positions that do not completely overlap with each other.

The first portion 71 of the side bar 70 may have a wide width to a position out of the first portion 61 of the spacing portion 60. For example, the first portion 71 of the side bar 70 may include an accommodation portion 71*a* formed at a position overlapping with the first portion 61 of the spacing portion 60 and a position fixing portion 71*b* formed at a position out of the first portion 61 of the spacing portion 60. For example, the first portion 71 of the side bar 70 may include: the accommodation portion 71*a* formed at a position overlapping with the first portion 61 of the spacing portion 60; and the position fixing portion 71*b* formed at a position out of the first portion 61 of the spacing portion 60, in other words, on the support 52*s* of the bottom wall 52. According to some embodiments, the side bar 70 may include a stepped portion 71*c* that connects the different thicknesses to each other between the accommodation portion 71*a* and the position fixing portion 71*b*. The stepped portion 71*c* may provide a position alignment structure for aligning the position of the side bar 70 between the accommodation portion 71*a* and the position fixing portion 71*b*.

The accommodation portion 71*a*, the position fixing portion 71*b*, and the stepped portion 71*c* will be described in more detail as follows. That is, the accommodation portion 71*a* may have a relatively large thickness in the third direction Z3. On the support 52*s* at the position out of the first portion 61 of the spacing portion 60, the position fixing portion 71*b* may be interposed between the battery cell 10 and the support 52*s* of the bottom wall 52 and fix the position of the side bar 70. According to some embodiments, according to positions in the second direction Z2, the bottom wall 52 of the housing 50 may include: the first portion 61 formed in a concavely recessed shape and the support 52*s* formed flat at a position out of the first portion 61, in other words, the support 52*s* formed flat and corresponding to the remainder of the bottom wall 52 except for the first portion 61. Here, in the second direction Z2, the accommodation portion 71*a* and the position fixing portion 71*b* of the side bar 70 may be formed at positions corresponding to the first portion 61 of the spacing portion 60 and the support 52*s*, respectively. For example, in the second direction Z2, the accommodation portion 71*a* of the side bar 70 may be formed at a position relatively adjacent to the corner position 50*c*, and the position fixing portion 71*b* may be formed at a position relatively far from the corner position 50*c*. As will be described later, the accommodation portion 71*a* formed at the corner position 50*c* having the relatively high stress concentration is to prevent or reduce interference between the corner positions 10*c* and 50*c* of the battery cell 10 and the housing 50. In order to prevent or reduce the interference between the corner positions 10*c* and 50*c* of the battery cell 10 and the housing 50, the accommodation portion 71*a* may have a relatively large thickness. The position fixing portion 71*b*, which is formed at a position relatively far from the corner positions 10*c* and 50*c*, is configured to fix the position of the side bar 70 entirely rather than being configured to prevent or reduce the interference between the corner positions 10*c* and 50*c* of the battery cell 10 and the housing 50, and thus may have a relatively small thickness within the limit necessary for fixing the position of the side bar 70. Throughout this specification, the thickness direction of the side bar 70 may mean the third direction Z3, and the side bar 70 may include the accommodation portion 71*a* having a relatively large thickness in the third direction Z3 and the position fixing portion 71*b* having a relatively small thickness.

The stepped portion 71*c* for connecting different thicknesses may be formed between the accommodation portion 71*a* and the position fixing portion 71*b*, which are connected to each other in the second direction Z2 and have different thicknesses in the third direction Z3. The stepped portion 71*c* may provide position alignment between the side bar 70 and the bottom wall 52. For example, according to some embodiments, the stepped portion 71*c* of the side bar 70 and a boundary portion 52*c* of the housing 50 include stepped jaws formed complementary to each other, and thus, the positions thereof may be fitted to each other. More specifically, in order for the stepped portion 71*c* of the side bar 70 to lie on the boundary portion 52*c* between the support 52*s* of the bottom wall 52 formed flat and the spacing portion 60 formed recessed, the stepped portion 71*c* of the side bar 70 and the boundary portion 52*c* of the housing 50 may include the stepped jaws complementary to each other, the positions thereof may be fitted to each other, and the positions thereof may be aligned with each other. For example, that the positions of the side bar 70 and the bottom wall 52 are aligned with each other may mean that the accommodation portion 71*a* of the side bar 70 is located at a position corresponding to the spacing portion 60 of the bottom wall 52 while the position fixing portion 71*b* of the side bar 70 is located at a position corresponding to the support 52*s* of the bottom wall 52. That is, according to the distance relative to the corner position 50*c* of the housing 50, the accommodation portion 71*a* of the side bar 70 may be located at the spacing portion 60 adjacent to the corner position 50*c*, and the position fixing portion 71*b* of the side bar 70 may be located at the support 52*s* relatively far from the corner position 50*c*.

The accommodation portion 71*a* of the side bar 70 may be located floating from the inner surface of the bottom wall 52 of the housing 50 corresponding to the first portion 61 of the spacing portion 60, and may be located between the bottom surface 12 of the battery cell 10 and the bottom wall 52 of the housing 50 while floating a certain height from the inner surface of the bottom wall 52 of the housing 50. The accommodation portion 71*a* of the side bar 70 is configured to prevent or reduce interference between the battery cell 10 and the housing 50 and may be spaced apart from at least one of the battery cell 10 or the housing 50 so as to prevent or reduce interaction between the battery cell 10 and the housing 50. According to some embodiments, the accommodation portion 71*a* of the side bar 70 may be selectively spaced apart from the housing 50 among the housing 50 and the battery cell 10, and may be spaced apart from the bottom surface 12 of the battery cell 10 or in contact with the bottom surface 12 of the battery cell 10. For example, the accommodation portion 71*a* of the side bar 70 may extend from one end supported by the position fixing portion 71*b* of the side bar 70 toward the corner position 50*c* of the housing 50 in the second direction Z2, and may be interposed between the inner surface of the bottom wall 52 of the housing 50 and the bottom surface 12 of the battery cell 10 which correspond to the first portion 61 of the spacing portion 60 formed at the corner position 50*c* of the housing 50. Here, the accommodation portion 71*a* of the side bar 70 may be supported while floating a certain height from the inner surface of the bottom wall 52 of the housing 50, and may have a fixing structure, such as a cantilever beam that extends from one end supported by the position fixing portion 71*b*.

If the side bar 70 for providing insulation between the battery cell 10 and the housing 50 is located between the battery cell 10 and the housing 50 and in close contact with each other, the interaction between the battery cell 10 and the housing 50 is not suppressed, but the interaction between the battery cell 10 and the housing 50 may be mediated thereby. Therefore, the accommodation portion 71*a* of the side bar 70 may be located spaced apart from the housing 50.

Unlike the accommodation portion 71*a* of the side bar 70, the position fixing portion 71*b* of the side bar 70 may be located between the battery cell 10 and the housing 50 and in close contact with each other. For example, the position fixing portion 71*b* may include an upper surface and a lower surface opposite to each other in the third direction Z3. The upper surface of the position fixing portion 71*b* may be in contact with the bottom surface 12 of the battery cell 10, and the lower surface of the position fixing portion 71*b* may be in contact with the bottom wall 52 of the housing 50. As described above, the position fixing portion 71*b* is interposed between the battery cell 10 and the housing 50 and in contact with each other, and thus, the position thereof is firmly fixed between the battery cell 10 and the housing 50. Also, the position of the side bar 70 entirely may be firmly fixed by the position fixing portion 71*b*. For example, the position fixing portion 71*b* may be pressed by the weight of the battery cell 10, and the position thereof may be fixed between the battery cell 10 and the bottom wall 52 of the housing 50. That is, the position fixing portion 71*b* is pressed by the weight of the battery cell 10 between the battery cell 10 and the bottom wall 52 of the housing 50, and the position thereof may be firmly fixed between the battery cell 10 and the bottom wall 52 of the housing 50.

The side bar 70 may include the second portion 72 interposed between the side wall 55 of the housing 50 and the second side surface 15 of the battery cell 10. Here, when examining fixing of the position of the side bar 70, the position of the side bar 70 may be fixed by the position fixing portion 71*b* formed in the first portion 71 that faces the bottom wall 52. However, the position of the side bar 70 may not be fixed by the second portion 72 that faces the side wall 55.

According to some embodiments, the second portion 72 of the side bar 70 may be formed between the side wall 55 of the housing 50 and the second side surface 15 of the battery cell 10. However, even if the second portion 72 of the side bar 70 is formed between the side wall 55 of the housing 50 and the second side surface 15 of the battery cell 10, the second portion 72 may not be in close contact with the side wall 55 of the housing 50 and the second side surface 15 of the battery cell 10. Accordingly, the position fixing force may not be provided by the second portion 72 of the side bar 70. According to some embodiments, the second portion 72 of the side bar 70 is for preventing or reducing interference between the battery cell 10 and the housing 50. When the second portion 72 of the side bar 70 is fixed in close contact with the battery cell 10 and the housing 50, such as being pressed between the battery cell 10 and the housing 50, the second portion 72 of the side bar 70 mediates the interaction between the battery cell 10 and the housing 50 rather than suppresses the interaction between the battery cell 10 and the housing 50. Therefore, according to some embodiments, the position of the second portion 72 of the side bar 70 may not be firmly fixed between the battery cell 10 and the housing 50, for example, the second portion 72 of the side bar 70 may be located somewhat loosely between the battery cell 10 and the housing 50. For example, the second portion 72 of the side bar 70 may be spaced apart from at least one of the second side surface 15 of the battery cell 10 or the side wall 55 of the housing 50. According to some embodiments, the second portion 72 of the side bar 70 is in contact with the second side surface 15 of the battery cell 10 but may be spaced apart from the side wall 55 of the housing 50. However, in various embodiments, the second portion 72 of the side bar 70 may be pressed between the battery cell 10 and the housing 50 and provide a position fixing force to the side bar 70 entirely.

The side bar 70 may be located at the corner position 50*c* of the housing 50, which faces the corner position 10*c* of the battery cell 10, thereby protecting the corner position 10*c* of the battery cell 10. Therefore, the corner position 10*c* of the battery cell 10 can be protected from external impact. For example, the side bar 70 may be made of a metal material. The side bar 70 may be made of a metal material, such as SUS, and protect the corner position 10*c* of the battery cell 10, at which external impact may concentrate, even with a small area while forming an edge. However, in various embodiments, the side bar 70 may be made of a metal material or may have an insulating coating formed on a metal material to prevent or reduce interference between the battery cell 10 and the housing 50. For example, the side bar 70 may be formed at the corner position 10*c* of the battery cell 10, at which external impact can concentrate, thereby alleviating the external impact toward the battery cell 10, and may prevent or reduce interference between the battery cell 10 and the housing 50 at the corner position 10*c* of the battery cell 10 while protecting the corner position 10*c* of the battery cell 10 from external impact. As described above, the side bar 70 may protect the battery cell 10 from external physical impact and electrical interference, thereby ensuring normal operation of the battery cell 10. Due to the function of the side bar 70 as described above, the side bar 70 may be made of a metal material strong against external impact, and may have a structure in which an insulating coating is formed on a frame of the metal material. However, in various embodiments, the side bar 70 may be made of a metal material on which an insulating coating is not formed.

The side bar 70 may be located between the second side surface 15 of the battery cell 10 and the inner surface of the side wall 55 of the housing 50, for example, may be located between the second side surface 15 of the battery cell 10 and the inner surface of the side wall 55 of the housing 50 that corresponds to the second portion 62 of the spacing portion 60. Here, the insulating sheet 80 together with the side bar 70 may be located between the second side surface 15 of the battery cell 10 and the inner surface of the side wall 55 of the housing 50. Here, unlike the side bar 70, the insulating sheet 80 does not include a reinforcing structure, such as a metal material, and may be provided, for example, in the form of a sheet of an electrically insulating polymer resin material. The insulating sheet 80 may be provided in the form of an insulating sheet for the purpose of eliminating electrical interference. The insulating sheet 80 may be formed over the entire height between the second side surface 15 of the battery cell 10 and the side wall 55 of the housing 50 in the second direction Z2, and the side bar 70 may be formed along a partial height at a position adjacent to the corner position 50*c* of the housing 50.

According to some embodiments of the present disclosure, a battery pack may be capable of preventing or reducing electrical and physical interference between a battery cell and a housing accommodating the battery cell at a corner position relatively vulnerable to external impact, thereby securing or improving insulation between the battery cell and the housing and protecting the battery cell.

The present disclosure has been described with reference to the embodiments illustrated in the drawings, but the embodiments are merely illustrative. Therefore, it will be understood by those with ordinary skill in the art to which the present disclosure pertains that various modifications and equivalent other embodiments are possible therefrom.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery pack comprising:

a plurality of battery cells; and a housing providing an accommodation space configured to accommodate the plurality of battery cells and comprising a side wall and a bottom wall which are in contact with each other at a corner position that faces a corner position of each of the battery cells, the housing having a spacing portion which is concavely recessed at the bottom wall to space the corner position of a battery cell from among the battery cells apart from the corner position of the housing; and a side bar between corner positions of the battery cell and the housing and extending downward into the spacing portion in the bottom wall, wherein the side bar comprises:

a first portion facing a first portion of the spacing portion and forming a width of the side bar; and a second portion facing a second portion of the spacing portion and forming a height of the side bar, wherein the width of the first portion of the side bar is larger than the width of the first portion of the spacing portion; and wherein the height of the second portion of the side bar is less than the height of the second portion of the spacing portion.

2. The battery pack of claim 1, wherein the spacing portion is at an inner surface of the housing that faces the battery cell from among the battery cells.

3. The battery pack of claim 1, wherein the spacing portion extends from the bottom wall of the housing to the side wall of the housing.

4. The battery pack of claim 3, wherein the spacing portion comprises:

a first portion on the bottom wall of the housing; and a second portion on the side wall of the housing.

5. The battery pack of claim 4, wherein the first portion of the spacing portion is formed such that an inner surface of the bottom wall of the housing is concavely recessed toward an outer surface of the bottom wall of the housing.

6. The battery pack of claim 4, wherein the bottom wall of the housing comprises:

the first portion of the spacing portion formed concavely recessed; and a support formed at a position out of the first portion of the spacing portion and having a flat shape to support a bottom surface of the battery cell from among the battery cells.

7. The battery pack of claim 6, wherein the support comprises an inner surface and an outer surface of the housing extending parallel to each other and has a flat shape with a constant wall thickness, and the first portion is recessed from the inner surface of the housing toward the outer surface of the housing and has a wall thickness that is less than the wall thickness of the support.

8. The battery pack of claim 4, wherein the second portion of the spacing portion is formed over an entire side wall of the housing, and the side wall of the housing, on which the second portion of the spacing portion is formed, has a uniform wall thickness.

9. The battery pack of claim 4, wherein the first portion of the spacing portion forms a first spacing gap that spaces a bottom surface of the battery cell from among the battery cells apart from the bottom wall of the housing, and the second portion of the spacing portion forms a second spacing gap that spaces a side surface of the battery cell apart from the side wall of the housing.

10. The battery pack of claim 9, wherein the first and second spacing gaps are connected to each other at the corner position of the housing and surround the corner position of the battery cell together.

11. The battery pack of claim 9, wherein the first spacing gap is formed locally in a portion of the bottom wall of the housing, and the second spacing gap is formed over an entire side wall of the housing.

12. The battery pack of claim 1, wherein the side bar surrounds a bottom surface and a side surface of the battery cell from among the battery cells.

13. The battery pack of claim 4, wherein the side bar comprises:

a first portion facing the first portion of the spacing portion and forming a width of the side bar; and a second portion facing the second portion of the spacing portion and forming a height of the side bar.

14. The battery pack of claim 1, wherein the spacing portion and the side bar are at the corner position of the housing at which the spacing portion and the side bar overlap with each other.

15. The battery pack of claim 14, wherein the spacing portion and the side bar overlap each other but do not completely overlap each other.

16. The battery pack of claim 15, wherein the side bar extends out of a first portion of the spacing portion.

17. The battery pack of claim 16, wherein the first portion of the side bar comprises:

an accommodation portion within a first spacing gap formed by the first portion of the spacing portion; and a position fixing portion on a support of the bottom wall that is out of the first portion of the spacing portion.

18. The battery pack of claim 17, wherein the accommodation portion is supported while floating within the first spacing gap formed by the first portion of the spacing portion.

19. The battery pack of claim 17, wherein the position fixing portion is supported between the support of the bottom wall, which is formed at a position out of the first portion of the spacing portion, and a bottom surface of the battery cell from among the battery cells, while being in contact with the support of the bottom wall and the bottom surface of the battery cell.

* * * * *